Patented May 8, 1928.

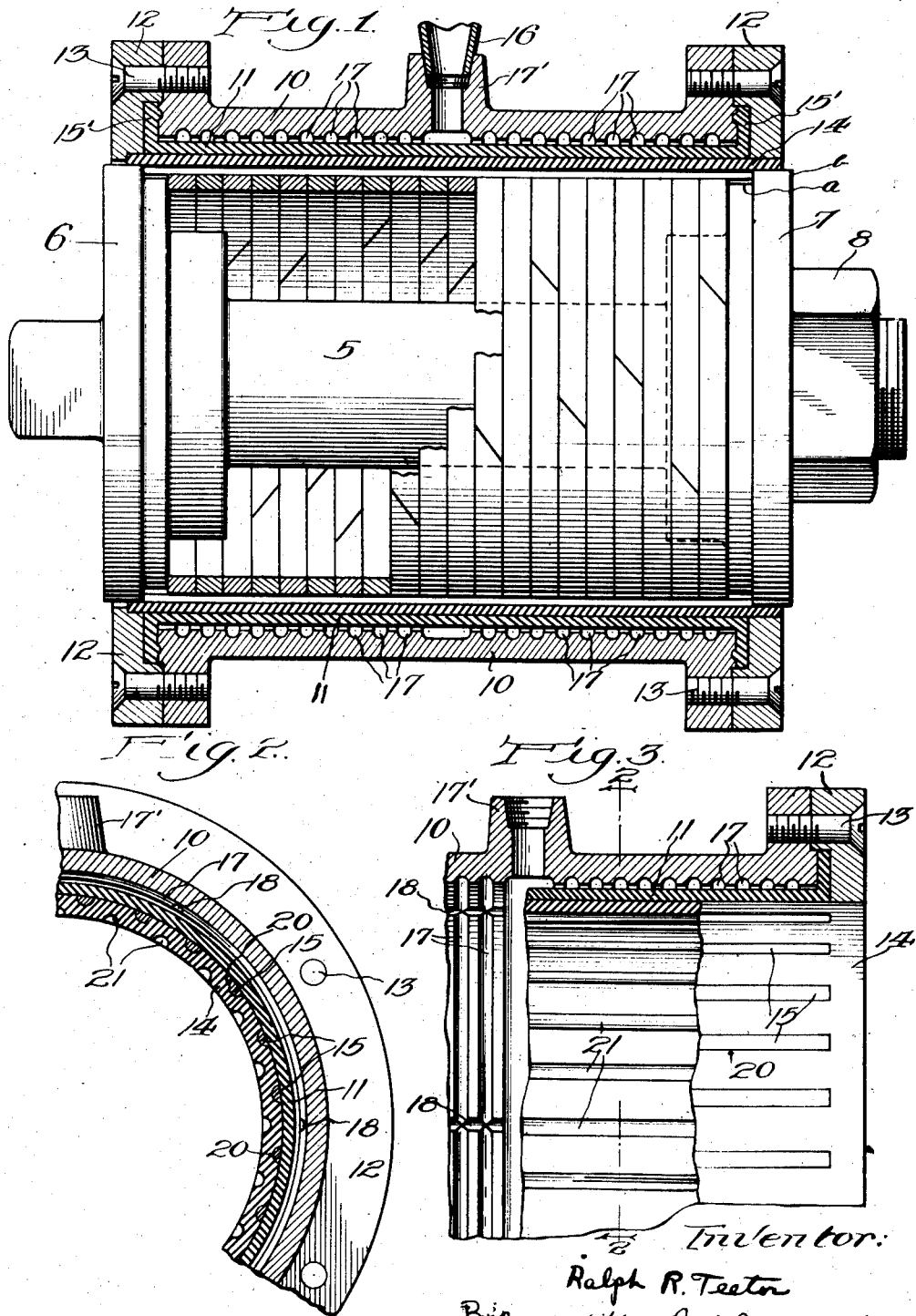

1,668,790

UNITED STATES PATENT OFFICE.

RALPH R. TEETOR, OF HAGERSTOWN, INDIANA, ASSIGNOR TO THE PERFECT CIRCLE COMPANY, OF HAGERSTOWN, INDIANA, A CORPORATION OF INDIANA.

TOOL FOR COMPRESSING PISTON RINGS.

Application filed April 22, 1926. Serial No. 103,915.

My invention relates to apparatus for compressing objects and is of particular service for effecting the closure of the gaps, which are formed in piston rings after they have been cast, in order to prepare them for the finishing of their exterior circumferential surfaces. I have shown and described an appartus or tool of this class in my U. S. Patent No. 1,454,350.

The principal objects of my present invention are to improve the construction and operation of the apparatus or tool and more accurately align or center the piston rings.

Another object of my invention is to provide a tube having a flexible inner wall provided with longitudinal members for the purpose of accomplishing a more accurate lineal or axial alignment of the piston rings with respect to each other but without interfering with or impairing the proper circularity or ring-closing adjustment of the individual rings. More specifically I provide a rubber tube subjected to fluid pressure and having imbedded in it longitudinally extending resilient rods, preferably formed of spring steel.

A further object of my invention is to provide an expansible chamber having one side or wall provided with grooves to effect a more uniform and rapid distribution of the air (or other suitable fluid agent) throughout the chamber when the air is admitted to the chamber.

The above and other objects of my invention will become more apparent from the following description taken in conjunction with the accompanying drawings.

Of said drawings, Fig. 1 is a longitudinal sectional view taken through a tool embodying my invention, and shows the ring supporting fixture or arbor and piston rings in place in the compressor, some of the rings being shown in section and others broken away; Fig. 2 is a cross sectional view taken through a portion of the compressor as on the line 2—2 of Fig. 3, and Fig. 3 is a longitudinal sectional view taken through a portion of the compressor and shows the inner rubber tube partly in section and partly in full and both of the rubber tubes broken away to disclose the grooves formed in the inner surface of the casing.

The device or fixture for carrying the piston rings comprises an arbor 5 having circular end plates or heads 6 and 7, the head 6 being permanently secured to the arbor while the head 7 is held in place thereon by means of a nut 8 in threaded engagement with one end of the arbor. The piston rings, after being split or parted by removal of the proper amount of metal at the joints, are placed upon the arbor between the slightly reduced portions $a$ of the end plates 6 and 7 and the nut 8 is screwed upon the threaded end of the arbor to move the end plate 7 towards the end plate 6 just sufficiently to clamp the rings in position between the plates, but not so tightly as to prevent the rings from having imparted to them a partial ring-closing adjustment in a centering shell or cylinder such as shown and described in my aforesaid patent. The action of the centering shell, as explained in my aforesaid patent, is such that the rings are centered on the arbor, the nut 8 then being fastened to firmly clamp the rings between the end plates 6 and 7, the rings being thus retained in their partially contracted condition when the shell is removed. While thus held in assembly, the rings are slipped into the compressor embodying my present invention.

My compressor comprises an outer cylindrical casing or shell 10, preferably formed of metal, a single-walled flexible tube 11, preferably of rubber, end rings or flanges 12, secured to the ends of the casing 10 by means of screws 13, and an inner flexible sleeve or tube 14 also preferably formed of rubber, and having rods 15 imbedded in its outer surface. The ends of the rubber tube 11 are turned outwardly to form radial flanges 15' which are firmly clamped between the rings 12 and the ends of the shell 10. Thus the rubber tube 11 and casing or shell 10 afford an air-tight compression or expansion chamber between them. An air hose or pipe 16 is connected to a nipple 17' integral with the shell 10 and through this air tube air under compression is admitted to the compression chamber under the control of any suitable valve (not shown). The arbor 5 and the centered piston rings thereon are slipped into the compressor while the tube 11 is deflated. It will be observed that the portions $b$ of the end plates 6 and 7 are of largest diameter and fit closely within the ends of the rubber sleeve 14 for the purpose of aiding in properly centering the arbor and rings in the compressor.

The interior cylindrical surface of the shell 10 is provided with a large number of circumferential grooves 17 and several communicating longitudinal grooves 18. When air is admitted to the rubber tube, it quickly passes through the different grooves 17 and 18 to effect a quick and equal distribution of the air throughout the expansion chamber. Should the tube become stuck at any point or portion to the interior surface of the shell, the air in the adjacent grooves will quickly separate the tube from the shell.

The inner tube 14 is also preferably formed of rubber and is so constructed that it will self-maintain its circular form and not collapse when the arbor and rings are not in the compressor. The outer cylindrical surface of the tube 14 is provided with squally-spaced longitudinal grooves 20 in which are positioned semi-circular rods 15 preferably formed of spring steel. The rods 15 are shorter than the tube 14, as shown in Fig. 3, so that the ends of the rods do not project over the portions b of the heads 6 and 7 and hence these portions do not interfere with the action of the rods 15. The inner cylindrical surface of the tube 14 is provided with longitudinal grooves 21, offset with respect to the grooves 20 so that the rods lie between the grooves 21. The grooves 21 are formed to make the tube 14 more flexible and efficient in operation and also to prevent the formation of wrinkles or ridges on the inside of the tube 14 during operation of the device.

When the piston rings are in place in the compressor, air is admitted to the expansion chamber under more than sufficient pressure to completely close all of the gaps at the joints of the ring, which were only partially closed to varying extents in the centering shell. The nut 8 is then loosened to permit the rubber tube 14, which is pressed against throughout its cylindrical surface by the tube 11, to close all of the piston-ring gaps by the pressure radially and inwardly exerted upon the rings in sufficient degree to secure this result. The rubber tube 14 acts on each of the rings individually to accomplish this function. The rings as a whole are also lineally or axially aligned with respect to each other. I have found from experience that when the inner sleeve 14 with the imbedded rods is not employed, the individual rings are properly closed but that the rings in some instances are not accurately axially aligned as a whole, so that when the rings are finished by turning in a lathe those not in line are not perfectly circular. By using the rods 15 I obtain a more accurate lineal alignment of all of the rings so that all of the rings when finished are circular.

After the rings have been properly aligned, the nut 8 is tightened to firmly clamp the rings in their closed condition between the end plates 6 and 7, the tube 11 is deflated and the rings and arbor are removed from the compressor. They are then placed in a lathe, the ends of the arbor 5 being suitably formed for mounting between the head and tail stocks of the lathe. The rings are then turned to a uniform external diameter whereafter the rings are demounted from the supporting arbor. The rings being aligned lineally, it will be seen that each of the piston rings is turned the proper extent throughout its entire exterior surface and the finished rings are circular and concentric.

While I have shown in the drawings only the preferred form of embodiment of my invention it will be obvious that various changes may be made without departure from the spirit of my invention. For example, the expansion chamber may be formed of a double-walled tube, as shown in my aforesaid patent, in which case the grooves 17 and 18 would be formed in the interior surface of the outer wall of the tube. The tubes 11 and 14 may also be integrally formed together, if desired, though I prefer to form them separately. The tubes may also be only semi-circular, though I believe that tubes extending entirely around the piston rings, as shown in the drawings, are more efficient in accomplishing the most accurate radial and axial alignment of the rings.

I claim:

1. A compressor comprising a flexible wall, subjected to fluid pressure, for contacting the objects to be compressed and aligned, and elements associated with said wall for aligning said objects lineally.

2. A compressor comprising a flexible wall subjected to fluid pressure for contacting the objects to be compressed and aligned, and spring rods imbedded in said wall for aligning said objects lineally.

3. A compressor for compressing piston rings, comprising a flexible wall, subjected to fluid pressure, for contacting the piston rings, and equally spaced longitudinally extending spring rods associated with said wall for aligning the piston rings lineally.

4. In a tool for exerting closing pressure upon piston rings, the combination with mounting means for clamping the piston rings in assembly, a rigid cylinder, a flexible wall within the cylinder and forming an expansion chamber, and resilient rods extending longitudinally of the wall and associated with it for aligning the piston rings lineally.

5. In a tool for exerting closing pressure upon piston rings, the combination with mounting means for clamping the rings in assembly, a rigid cylinder, a flexible wall within the cylinder and forming an expansion chamber, and spring rods imbedded in the wall for aligning the piston rings lineally.

6. In a tool for exerting closing pressure upon piston rings, the combination with mounting means for clamping the rings in assembly, a rigid cylinder, a flexible wall within the cylinder forming an expansion chamber and having longitudinal grooves in its inner surface, and spring rods imbedded in the wall for aligning the piston rings lineally, said longitudinal grooves being between the rods.

7. In a tool for exerting closing pressure upon piston rings, the combination of a rigid cylinder, a flexible tube within the cylinder forming an expansion chamber, a flexible sleeve within said tube, and longitudinally extending rods between the tube and sleeve.

8. In a tool for exerting closing pressure upon piston rings, the combination of a rigid cylinder, a flexible tube forming an expansion chamber, a flexible sleeve within said tube and resilient rods positioned in grooves in the exterior surface of said sleeve.

9. In a tool for exerting closing pressure upon piston rings, the combination of a rigid cylinder, a flexible tube forming an expansion chamber, a flexible sleeve within said tube and having longitudinal grooves formed in its interior surface, and resilient rods positioned in grooves in the exterior of said sleeve.

10. In a tool for exerting closing pressure upon piston rings, the combination of a flexible sleeve or tube having equally spaced longitudinal grooves in its exterior surface, and spring rods positioned in said grooves.

11. In a tool for exerting closing pressure upon piston rings, the combination of a flexible sleeve or tube having equally spaced longitudinal grooves in its exterior surface and longitudinal grooves in its inner surface, and resilient rods positioned in said grooves, formed in one of said surfaces.

12. In a tool for exerting closing pressure upon piston rings, the combination of a flexible sleeve or tube having equally spaced longitudinal semi-circular grooves in its outer surface and a like number of intermediate grooves in its inner surface, and semi-cylindrical spring rods located in the grooves in the outer surface.

13. In a tool for exerting closing pressure upon piston rings, the combination of a flexible sleeve or tube having equally spaced longitudinal grooves in its exterior surface, resilient rods positioned in said grooves, and means forming an expansion chamber and including a flexible tube around said sleeve.

14. In a tool for exerting closing pressure upon piston rings, the combination of a rigid cylinder having grooves formed in its inner wall, a flexible single walled tube within the cylinder forming an expansion chamber with the cylinder.

15. In a tool for exerting closing pressure upon piston rings, the combination of a narrow expansion chamber having its inner wall formed of flexible material and the chamber-side of one of its walls provided with grooves.

In testimony whereof, I have subscribed my name.

RALPH R. TEETOR.